Dec. 10, 1968 M. B. PELTIER 3,416,006

DIGITAL DATA PROCESSING SYSTEM

Original Filed May 22, 1964

Inventor:
Max Bruno Peltier
By
Kemon, Palmer, Stewart & Estabrook
Attorneys

United States Patent Office 3,416,006

Patented Dec. 10, 1968

3,416,006

DIGITAL DATA PROCESSING SYSTEM

Max Bruno Peltier, Courbevoie, Hauts-de-Seine, France, assignor to Societe d'Electronique et d'Automatisme, Courbevoie, Hauts-de-Seine, France Continuation of application Ser. No. 369,471, May 22, 1964. This application Nov. 27, 1967, Ser. No. 685,979

Claims priority, application France, May 24, 1963, 935,903

4 Claims. (Cl. 307—238)

ABSTRACT OF THE DISCLOSURE

A binary data processing circuit is disclosed by the herein specification. It generally comprises an input circuit adapted to perform a logical operation with a plurality of input signals. A bistable one digit store is controlled by the output of said input circuit, and is connected to output means for deriving two complementary signals from said store. The processing circuit is further provided with at least one terminal whereby a function conditioning signal is applied to the circuit such that the circuit operates as processing circuit or as a store in dependence on the conditioning signal.

This application is a continuation of my application Ser. No. 369,471, filed May 22, 1964, for Digital Data Processing System, now abandoned.

The invention relates to data processing circuits and to data processing systems of the kind wherein information is available as serially occurring binary signals.

It has already been proposed to build such systems with logical processing circuits, each one being identical to any other one and each simultaneously performing two simple logical operations, actually complementary ones. The said circuits should be interconnected in cascaded and/or parallel relationships for establishing networks wherein the progression and handling of information is controlled from programming units. It is well known that any complex logical operation can be analyzed as a set of simple logical operations. Consequently, by using identical procession circuits, systems can be built for effecting any complex logical operations from progressively and/or simultaneously made elementary or simple logical operations. Timing signals from the control unit ensures the progression of the signals and their time coincidence in such circuit arrangements. Temporary store circuits may be associated with the logical processing circuits when required and, as is known, such circuits may be at least partly included in the logical processing circuits. Up to now, however, such temporary store circuits were controlled by the same timing signals as the data logical operator circuits proper.

It is one object of the invention to provide a logical processing circuit performing two simultaneous simple or elementary logical functions, and including a temporary store means for the two logical results of operation; the operation of which is controlled both by timing signals and by functional logical or storing control signals.

A further object of the invention is to provide a logical processing circuit that will work at a very high speed to handle information in such systems; that has rapid access and operation; and which does not require resetting or, that is, a rest period and as a consequence is capable of dealing with further signals under a further control without necessity of being cleared between such successive controls.

The various features and advantages of the invention will be apparent from the following description taken with reference to the accompanying drawings, wherein.

Figure 1:
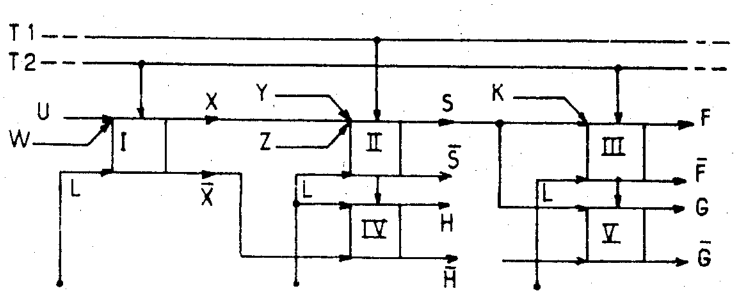
FIGURE 1 is a schematic diagram of part of a data processing system embodying the invention.
Figure 3:
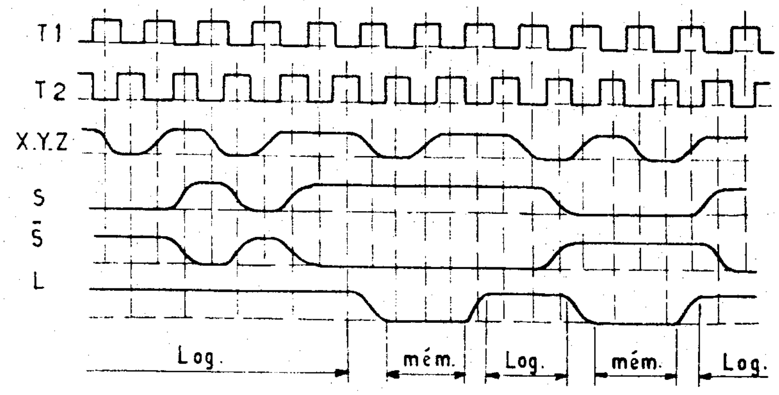
FIGURE 3 shows graphs employed in the explanation of the operation of FIGURES 1 and 2.

Referring to FIGURE 1, the diagram shows five identical logical circuits, I to V, interconnected in an arbitrary relation according to what may be said to be three successive "stages" of a data processing system with reference to the timing of the system. The timing signals are distributed on two leads T1 and T2 carrying, for instance, the two waveforms of the same identification as shown in the graphs of FIGURE 3. As shown, these waveforms are in relative phase opposition, though this is not imperative for putting the invention into actual practice; a relative phase-shift of another value (not too small, however) may be used as well as another number of timing signal waveforms (for instance, three waveforms relatively shifted by 120° instead of the two shifted by 180° as shown). Also, the timing signals T1 and T2 are shown as being of rectangular or square waveform, and this, too, is not imperative; each may consist of a series of pulses narrower than the intervals therebetween.

Circuit I, constitutes the first stage. It receives two information signals on input leads U and W, and a function selecting or determining signal on an input lead L. It delivers two signals, X and $\overline{X}$, complementary to one another; when X is a high voltage or current output signal the complement $\overline{X}$ has a low voltage or current value, and conversely. Circuit I, and the following circuits, may act either as a logical circuit or as a storage circuit, and it is the value of the signal L which determines which one of the two operations the circuit will perform at any given time. For this reason the lower input of any square representing a processing circuit may be termed a "function conditioning" or "function selecting" input for said circuit.

Circuit II, is of the same construction as Circuit I, and it has one of its information inputs connected to the X output of Circuit I. It also receives as information signals, two further signals on leads Y and Z, and it receives a function conditioning signal L on its function conditioning input lead. Circuit II delivers two complementary output signals S and $\overline{S}$. On the other hand, the processing Circuit IV of the same timing stage as Circuit II, receives only the signal L as an information signal and the signal $\overline{X}$ from the stage I as a function conditioning signal. The outputs of Circuit IV are referenced H and $\overline{H}$. The third stage comprises two processing Circuits III and V, both receiving the signal S as one of their information input signals. The Circuit III receives a further information signal on a lead K, and a function conditioning signal L. Circuit V receives a conditioning signal which is unidentified, as for instance, the said Circuit V is a re-phasing circuit for the signal S to be used in a further stage of the system. Circuit III delivers output signals F and $\overline{F}$, and Circuit V output signals G and $\overline{G}$.

As is apparent, the various signals may come from other stages of the system and/or from stores (not shown but conventional in such systems), and/or from instructions of a program (also not shown but conventional in such systems). The interconnections between the processing circuits may be permanent, constituting then a part of a fixed program, or they may be controlled from instructions by means of routing gates unblocked by such program instructions as defined in the programs of the system. Such ancillary services are presently quite conventional in the art and consequently do not require any further description or explanation.

Figure 2:
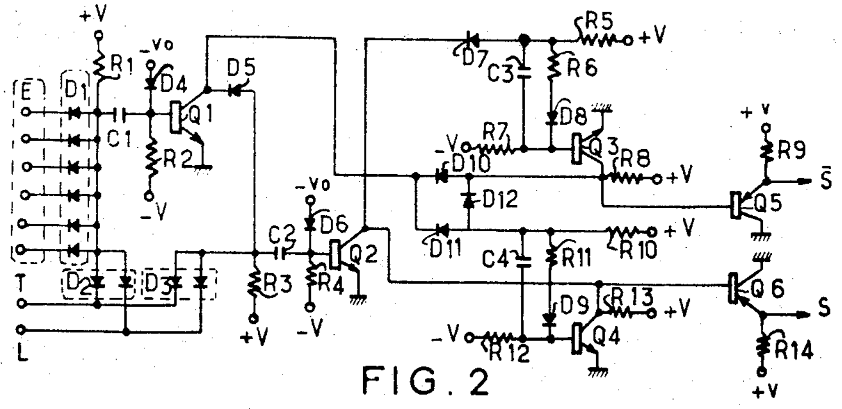
FIGURE 2 is a circuit diagram of a logical circuit used for building up such a system.

Considering for instance the processing Circuit II of FIGURE 1, to which the graphs of FIGURE 3 particularly relate, the said circuit, as any other one in the system, may be provided as shown in detail by the circuit diagram of FIGURE 2. In this example, the input logic of the circuit consists of an AND operation, corresponding to the logical operation of intersection of variables in the Boolean algebra. The AND signal is shown at X.Y.Z. in FIGURE 3 whereby, according to the timing sitgnal T1 and the waveform of the function conditioning signal L on said graph, the output signals S and $\overline{S}$ have the shown waveforms. It may be seen that, as long as the function conditioning signal L remains at its higher level, the output signal S follows, with one timing period shift, the variation of the intersection result X.Y.Z. each such period for L being denoted as Log. Each time the signal L comes to its lower value, periods marked mēm, any variation in the product X.Y.Z. is ignored by the output signal S. This example gives an obvious application of the possibilities of the additional function conditioning signal applied to logical processing operations. In this example, the said conditioning signal acts as an AND operation element with the information and timing signals; of course, it may be provided to act thereon differently, for instance, in a simple or an exclusive OR relation with the intersection (AND) signal X.Y.Z. and the timing signal T. Also, the AND operation on the information signal is not imperative and another simple logical function between such signals may be substituted.

In the example shown in FIGURE 2, the logical circuit comprises first an input AND-network comprising the group of diodes D1 and the two diodes D2. Diodes D1 are individually connected to input terminals (E) for receiving information signals; diodes D2 respectively receive the timing signal from an input terminal T and the function conditioning signal at input terminal L. When the circuit is connected in a processing system, the unused input terminals, among terminals (E), remain such that they do not enter in the AND operation effected in such a network. The anodes of diodes D1 and D2 are connected to a common point biased through a resistance R1 from a potential +V. The potential of said common point remains at a lower value as long as one of the inputs (E), T and L receives a lower value potential input. When all values of potential at said inputs are at a higher level value, the potential of said common anode point comes to its higher value, thereby defining a positive result of the AND operation, according to a well-known operation.

The output of the AND-network is applied through a series condenser C1 to the base of a transistor Q1. The said base is biased to a potential —V through a resistance R2 and a diode D4 which has its cathode connected to the base of Q1 and its anode to a potential —VO so as to define the threshold of activation of the transistor Q1. Q1 must be triggered each time the result of the AND operation is positive. A transistor Q2 is shown in FIGURE 2 which transistor must always be in a state of conductivity opposite to Q1; e.g., if Q1 is on then Q2 is off and vice versa. Said transistor Q2 has its base biased according to the same arrangement as Q1, i.e., to —V through a resistance R4 with a trigger threshold defined by a diode D6 to the potential —VO. As for Q1 and Q2, the emitters are grounded. The input to the base of Q2 is made through a series condenser C2 from a point biased to +V through a resistance R3 which constitutes the output terminal of a further AND-network comprising a diode D5 connected to the collector output of Q1, and two diodes D3 respectively connected to terminals T and L of the circuit. The response of such an AND-network is similar to the first above described one, i.e., when signals T and L are at their higher values and the collector output from Q1 is at its higher level value the transistor Q2 will be triggered. When no positive AND result is present at the common point of the network D1–D2, Q1 is blocked. When the said result is positive, Q1 is unblocked and from such triggering the collector potential rises up and Q2, which was conductive, is blocked.

The supply voltage for the collector of Q1 results from the combination of the voltage +V through D5 (when D5 is conductive), +V through R10 and D11 (when D11 is conducting) and +V through R8 and D10 (when D10 is conducting). The potential of the collector of Q2 comes from +V through R5 and D7 (when D7 is conducting) and +V through R13. The collector outputs of Q1 and Q2 are connected to the inputs of a bistable circuit comprising the transistors Q3 and Q4. The internal link of said circuit passes through a diode D12 from the collector of Q3 and the base of Q4 and the other through D7 from the collector of Q4 to the base of Q3. Each one of the transistors Q3 and Q4 has a grounded emitter. The biasing of the base of Q3 is taken on the voltage divider R5–R6–D8–R7 connected between +V and —V. The biasing of the base of Q4 is taken from the voltage divider R10–R11–D9–R12. A condenser C3 is connected in shunt across R6–D8 in order to provide the input triggering network for the base of Q3 through the diode D7. Similarly, a condenser C4 is connected in shunt across R11–D9 for the triggering of said transistor Q4 through either D11 or D12.

The emitter follower transistors Q5 and Q6 are respectively blocked, the diodes D2 and D3 are also blocked and the two transistors Q1 and Q2 are simultaneously controlled by their bases toward saturation. However, at a time instant of this saturation course, diode D5 is made conducting and, as Q1 still saturates, Q2 is blocked from Q1. From this time instant, the downward edge of the collector voltage from Q1 blocks Q4 if this latter was saturated (if it was blocked, it will remain blocked). The uprising edge of the collector voltage of Q4 blocks the diode D7 and the current through R5 begins to saturate Q3 (if it was blocked) and as soon as the charge supplied to the base of Q3 is of a sufficient value, Q3 is and remains saturated. The signal T can return to its lower value for blocking Q1. The outputs S and $\overline{S}$ thus display the result of the intersection AND operation of the input signals, viz. 1.

The emitter-followers follow the variations of the bistable circuit. For "read-out" it is convenient that the resistances R9 and R14 are of relatively low resistance values for the connections to the next following stage or stages since, in said following stage or stages the output voltages from the emitter-followers will constitute the input signals, information and/or function conditioning signals as aforestated. Denoting $Cp$ as the stray capacity from the wiring on R9 or R14, it is important that the slope $V/(R9.Cp)$ or the slope $V/(R14.Cp)$ be higher than the slopes $V/(R1.C1)$ and $V/R2.C2$ of the following stage for efficiently controlling the transistors Q1 and Q2 in said following stage. The bistable circuit may consequently be provided with such a high impedance level that the consumptions of current are reduced for the supply and control of the said circuit while satisfactory to the stated output condition due to the provision of the emitter-followers. Conversely, the bistable circuit cannot be accidentally actuated from the outputs since the emitter-followers act as buffers in this respect.

The processing circuit as shown in FIGURE 2 is a fast operating circuit. The charge supplied to the base of transistor Q3 is reduced since the action of the collector-to-base capacity is substantially eliminated in the input activating circuit of the bistable circuit; transistors Q1 and Q2 are controlled through condensers, and saturation is reached simultaneously to the collector voltage edge in the collector voltage change. Consequently, defining $t_0$ as the time interval during which the signal T presents its higher value, the operating frequency is at most equal to $\frac{1}{2}t_0$. In order to obtain this maximum condition it is necessary that the condensers C3 and C4 are of a sufficient value to effectively block the transistors while they recover their initial state or at least nearly recover the said state during a time interval of approximately $2t_0$. The time constant for this recovery may be provided slightly higher than $2t_0/3$ for example, and to this end diodes D7 and D12 are provided for maintaining the steepness of the uprising edges of the variations of collector voltage, and diode D11 is provided for reducing the extent of the voltage variation on C4 at the time when Q4 must be blocked from the saturation of Q3. This effect is reinforced by the provision of diodes D8 and D9 which provide, at such time for a same value of the voltage across Q3 and Q4, a paralleled impedance which is lower than if only the resistances R6 and R11 were used—for an identical time constant, consequently, the values of C3 and C4 may be higher which increases the quickness of the changes of condition of the bistable circuit.

I claim:

1. A binary data processing circuit comprising:

an input circuit adapted to perform a logical operation with a plurality of input information signals;

a bistable one-digit store controlled from the output of said input circuit;

output buffer means operatively connected to the output of said store and to at least two output terminals for deriving complementary output signals from said store;

a timing signal input terminal connected to said input circuit;

a function conditioning signal terminal connected to said input circuit for applying a circuit operational control signal to said processing circuit whereby said circuit operates as a logical operator for one function conditioning signal condition and as a store for a second function conditioning signal condition, wherein said input circuit includes a logical operating circuit connected to one input of said bistable store through a first translating member connected such that it is jointly controlled by said plurality of input information signals, a timing signal on said timing signal input terminal and a control signal on said function conditioning signal terminal; and wherein said input circuit further includes a second translating member connected such that it is jointly controlled by the output of said first translating member, a timing signal on said timing signal input terminal, and a control signal on said functional conditioning signal terminal for applying an output to the other input of said bistable store.

2. A circuit according to claim 1 wherein said logical operating circuit is an AND circuit, and wherein the output from said first translating member, said timing signal and said control signal are applied to said second translating member by a second AND circuit.

3. A circuit according to claim 1 wherein said translating members comprises transistors having their inputs connected to diode gate networks.

4. A circuit according to claim 1 wherein said one digit store comprises a cross-coupled transistorized bistable circuit.

References Cited

UNITED STATES PATENTS

| | | | |
|---|---|---|---|
| 3,041,477 | 6/1962 | Budts et al. | 307—88.5 |
| 3,059,127 | 10/1962 | Snyders | 307—88.5 |
| 3,132,260 | 5/1964 | Gunderson et al. | 307—88.5 |
| 3,170,075 | 2/1965 | Mellott | 307—88.5 |
| 3,234,402 | 2/1966 | Budts et al. | 307—88.5 |

ARTHUR GAUSS, *Primary Examiner.*

S. D. MILLER, *Assistant Examiner.*

U.S. Cl. X.R.

307—208, 218, 221, 289, 292